United States Patent
Seki

(10) Patent No.: US 9,286,066 B2
(45) Date of Patent: Mar. 15, 2016

(54) PROCESSOR, AND METHOD OF LOOP COUNT CONTROL BY PROCESSOR

(75) Inventor: Katsutoshi Seki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 906 days.

(21) Appl. No.: 13/508,977

(22) PCT Filed: Oct. 15, 2010

(86) PCT No.: PCT/JP2010/068116
§ 371 (c)(1),
(2), (4) Date: May 9, 2012

(87) PCT Pub. No.: WO2011/065145
PCT Pub. Date: Jun. 3, 2011

(65) Prior Publication Data
US 2012/0226894 A1    Sep. 6, 2012

(30) Foreign Application Priority Data
Nov. 24, 2009    (JP) .................................. 2009-266347

(51) Int. Cl.
G06F 9/30    (2006.01)
G06F 9/32    (2006.01)
G06F 9/34    (2006.01)

(52) U.S. Cl.
CPC ........ *G06F 9/30065* (2013.01); *G06F 9/30101* (2013.01); *G06F 9/325* (2013.01); *G06F 9/34* (2013.01)

(58) Field of Classification Search
USPC .............. 712/E9.078, E9.049, 205, 223, 225, 712/227, 231, 233, 241, 244
See application file for complete search history.

(56) References Cited

U.S. PATENT DOCUMENTS

| | | | | |
|---|---|---|---|---|
| 4,885,682 A | * | 12/1989 | Komoto | ........................ 712/236 |
| 5,507,027 A | * | 4/1996 | Kawamoto | .................... 712/241 |
| 5,680,600 A | * | 10/1997 | Childers et al. | ............... 712/245 |
| 5,774,711 A | * | 6/1998 | Henry et al. | ................... 712/244 |
| 5,850,551 A | | 12/1998 | Takayama et al. | |

(Continued)

FOREIGN PATENT DOCUMENTS

| | | | |
|---|---|---|---|
| JP | 57-076650 A | 5/1982 |
| JP | 60-147841 A | 8/1985 |

(Continued)

OTHER PUBLICATIONS

International Search Report in PCT/JP2010/068116 dated Nov. 22, 2010 (English Translation Thereof).

*Primary Examiner* — Andrew Caldwell
*Assistant Examiner* — Michael Metzger
(74) *Attorney, Agent, or Firm* — McGinn IP Law Group, PLLC

(57) ABSTRACT

A processor includes a loop counter that is reset to 0 when a loop instruction for executing a process in a loop from a loop start address to a loop end address is issued, a data memory that receives data that is used for executing a process in the loop, in which the data is transferred from outside, a calculator that uses the data transferred to the data memory to execute the process in the loop, a data counter that increments the loop counter by 1 every time a certain amount of data that is used for executing a process in the loop is transferred from outside to a data memory, and a loop controller that decrements the loop counter by 1 and causes the calculator to execute the process in the loop when a loop count value of the loop counter is not 0.

20 Claims, 5 Drawing Sheets

(56) References Cited

U.S. PATENT DOCUMENTS

| | | | |
|---|---|---|---|
| 5,978,875 A | 11/1999 | Asano et al. | |
| 6,035,378 A * | 3/2000 | James | 711/147 |
| 6,658,552 B1 * | 12/2003 | Klein | 712/34 |
| 6,671,799 B1 * | 12/2003 | Parthasarathy | 712/241 |
| 7,366,885 B1 * | 4/2008 | Radhakrishnan et al. | 712/241 |
| 2001/0010074 A1 * | 7/2001 | Nishihara et al. | 712/227 |
| 2002/0078333 A1 | 6/2002 | Inoue et al. | |
| 2009/0024842 A1 * | 1/2009 | Clark et al. | 712/241 |

FOREIGN PATENT DOCUMENTS

| | | |
|---|---|---|
| JP | 07-200292 A | 8/1995 |
| JP | 8-314719 A | 11/1996 |
| JP | 09-237186 A | 9/1997 |
| JP | 9-251437 A | 9/1997 |
| JP | 2004-021890 A | 1/2004 |
| JP | 2004-070642 A | 3/2004 |
| JP | 2004-516571 A | 6/2004 |
| WO | WO02/50666 A2 | 6/2002 |

\* cited by examiner

PROCESSOR, AND METHOD OF LOOP COUNT CONTROL BY PROCESSOR

TECHNICAL FIELD

The present invention relates to a processor with a hardware loop function, and particularly, to a processor that controls loop count.

BACKGROUND ART

In a processor, an instruction included in a program is stored in an instruction memory. If the program has a repetitive structure for repeatedly using one or a plurality of instructions, a conditional branch instruction can be used to create a loop program to reduce the capacity of the instruction memory. However, an overhead for returning from a loop end to a loop start (or out of the loop) is generated when the conditional branch instruction is used.

In particular, in a pipeline processor, an instruction in a pipeline that is already fetched is invalidated when the conditional branch instruction is used. An instruction of a branch destination is newly fetched, and the overhead becomes prominent.

Therefore, the processor generally has a function of using a loop instruction to set a loop start address, a loop end address, and loop count to a register, and the hardware manages and executes the loop processing without the overhead. The function is called a hardware loop function, a zero overhead loop function, a zero delay loop function, a loop instruction function, or the like. In the specification, the functions will be collectively called a hardware loop function unless otherwise specifically stated.

FIG. 1 shows a configuration of a related processor with the hardware loop function. Details of the related art are disclosed in Patent Literature 1 and Patent Literature 2.

As shown in FIG. 1, processor 1002 of the related art includes program counter 100, instruction memory 200, instruction decoder 300, calculator 400, data memory 500, loop counter 600, and loop controller 700.

Program counter 100 notifies instruction memory 200 and loop controller 700 of an instruction address of an instruction to be issued. Usually, program counter 100 sequentially increments the instruction address and notifies the incremented instruction address. However, if calculator 400 or loop controller 700 sets an instruction address jump destination described later, program counter 100 transfers the instruction address of the set jump destination.

Instruction memory 200 fetches an instruction according to the instruction address notified by program counter 100 and issues the fetched instruction to instruction decoder 300.

Instruction decoder 300 decodes the instruction issued by instruction memory 200 and notifies calculator 400 of the decoded instruction as a calculation control signal. If a loop instruction is issued, instruction decoder 300 sets the loop start address and the loop end address to loop controller 700.

Calculator 400 performs various calculations according to the calculation control signal notified by instruction decoder 300. Calculator 400 loads data necessary for the calculations from data memory 500 to store the data in a register file included inside and uses the data to perform the calculations. Calculator 400 can also store a calculation result in data memory 500. If the calculation control signal obtained by decoding the loop instruction is notified, calculator 400 sets the loop count to loop counter 600. If the calculation control signal obtained by decoding the conditional branch instruction is notified, calculator 400 can branch the program progress by setting the instruction address jump destination to program counter 100 when a state (for example, a register file value or a data transfer completion notification signal notified by DMAC (Data Memory Access Controller) 3000) coincides with a condition defined by the calculation control signal.

Data memory 500 stores data from calculator 400 and loads data on calculator 400. Data can be transferred between data memory 500 and external memory 4000 outside of the processor through external bus 2000. DMAC 3000 manages the data transfer. DMAC 3000 manages the data transfer based on DMAC setting input from an external device including processor 1002.

If the instruction address notified by program counter 100 coincides with the loop start address set by instruction decoder 300, loop controller 700 notifies loop counter 600 of a decrement signal.

Loop counter 600 handles the loop count set by calculator 400 as an initial value of the loop count value. Every time the decrement signal is notified by loop controller 700, loop counter 600 decrements the loop counter value by 1 and notifies loop controller 700 of the decremented loop count value.

If the instruction address notified by program counter 100 coincides with the loop end address set by instruction decoder 300 and if the loop count value notified by loop counter 600 is not 0, loop controller 700 notifies program counter 100 of the loop start address as the instruction address jump destination.

If the instruction address notified by program counter 100 coincides with the loop end address set by instruction decoder 300 and if the loop count value notified by loop counter 600 is 0, loop controller 700 notifies program counter 100 of an instruction address following the loop end address as the instruction address jump destination.

In this way, according to the related art, the loop count needs to be identified before the loop instruction is issued, and calculator 400 needs to hold the information of the loop count.

However, in some applications, the loop count depends on an amount of data that is used for executing a process in the loop, and information about the amount of data that is used for executing a process in the loop is transferred after the completion of the transfer of the data that is used for executing a process in the loop from external memory 4000 to data memory 500.

In such an application, loop processing needs to be started after the data that is used for executing a process in the loop and the information about the amount of data that is used for executing a process in the loop are transferred to the data memory 500. This leads to an increase in the capacity of data memory 500 and an increase in the delay of the process.

FIG. 2 shows a processing flow when the information of the amount of data that is used for executing a process in the loop is transferred after the data that is used for executing a process in the loop is transferred in processor 1002 of the related art shown in FIG. 1.

As shown in FIG. 2, external memory 4000 transfers the data that is used for executing a process in the loop to data memory 500 (step S101), and then the information of the amount of data that is used for executing a process in the loop is transferred (step S102).

After checking the completion of the transfer of the information of the amount of data that is used for executing a process in the loop, calculator 400 calculates the loop count based on the amount of data that is used for executing a process in the loop (step S103). The completion of the transfer can be checked by the data transfer completion notification signal notified by DMAC 3000.

Subsequently, if the loop instruction is issued (Yes in step S104), the loop count calculated by calculator 400 is set to loop counter 600 as the initial value of the loop count value. The loop start address and the loop end address are set to loop controller 700 (step S105).

After the issue of the loop instruction, the program proceeds until the instruction address coincides with the loop start address.

If the instruction address coincides with the loop start address (Yes in step S106), loop controller 700 notifies loop counter 600 of the decrement signal, and loop counter 600 reduces the loop count value by 1 (step S107). Subsequently, calculator 400 advances the process in the loop until the instruction address reaches the loop end address (step S108).

If the instruction address coincides with the loop end address (Yes in step S109), loop controller 700 executes a loop completion determination process.

If the loop count value is not 0 (No in step S110), loop controller 700 determines that the loop processing is not completed and notifies program counter 100 of the loop start address as the instruction address jump destination (step S111).

On the other hand, if the loop count value is 0 (Yes in step S110), loop controller 700 determines that the loop processing is completed and notifies program counter 100 of the instruction address that follows the loop end address as the instruction address jump destination (step S112).

In this way, the process in the loop can be executed based on the set loop count.

CITATION LIST

Patent Literature

Patent Literature 1: JP07-200292A
Patent Literature 2: JP09-237186A

SUMMARY OF INVENTION

Technical Problem

As described, the loop count needs to be identified before the issue of the loop instruction in the processor disclosed in Patent Literature 1 and Patent Literature 2.

Therefore, in an application in which the loop count depends on the amount of data that is used for executing a process in the loop, and in which the amount of data that is used for executing a process in the loop is identified after the data that is used for executing a process in the loop is transferred from the outside to the data memory, the loop processing is started after the data that is used for executing a process in the loop and the information about the amount of data that is used for executing a process in the loop are stored in the data memory. As a result, there is a problem that this leads to an increase in the capacity of the data memory and an increase in the delay of the process.

The present invention has been made in view of the foregoing problem, and an object of the present invention is to provide a processor and a method of loop count control by the processor that can reduce the capacity of the data memory and reduce the delay of the process.

Solution to Problem

The present invention provides a processor comprising:
a loop counter that is reset to 0 when a loop instruction for executing a process in a loop from a loop start address to a loop end address is issued;
a data memory that receives data that is used for executing a process in the loop, in which the data is transferred from outside;
a calculator that uses the data transferred to said data memory to execute the process in the loop;
a data counter that increments said loop counter by 1 every time a certain amount of data that is used for executing a process in the loop is transferred from outside to a data memory; and
a loop controller that decrements said loop counter by 1 and causes said calculator to execute the process in the loop when a loop count value of said loop counter is not 0.

The present invention provides a method for controlling loop count by a processor, the method comprising the steps of:
resetting a loop counter to 0 when a loop instruction for executing a process in a loop from a loop start address to a loop end address is issued;
incrementing said loop counter by 1 every time a certain amount of data that is used for executing a process in the loop is transferred from outside to a data memory; and
decrementing said loop counter by 1 and executing the process in the loop when a loop count value of said loop counter is not 0.

Advantageous Effects of Invention

The processor of the present invention executes the process in the loop by resetting the loop count to 0 if the loop instruction is issued, incrementing the loop counter every time the certain amount of data that is used for executing a process in the loop is transferred to the data memory, and decrementing the loop counter if the loop count value of the loop counter is not 0.

More specifically, the processor of the present invention repeatedly executes the process in the loop according to the amount of the data transferred to the data memory, without setting the loop count.

Therefore, even in an application in which the loop count depends on the amount of data that is used for executing a process in the loop, and the amount of data is identified after the data is transferred from the outside to the data memory, the loop processing can be started just after the start of the data transfer.

As a result, compared to the related art, there are advantageous effects that the capacity of the data memory can be reduced and the delay of the process can be reduced.

DESCRIPTION OF EMBODIMENTS

Hereinafter, exemplary embodiments for carrying out the present invention will be described with reference to the drawings.

(First Exemplary Embodiment)

Figure 3:
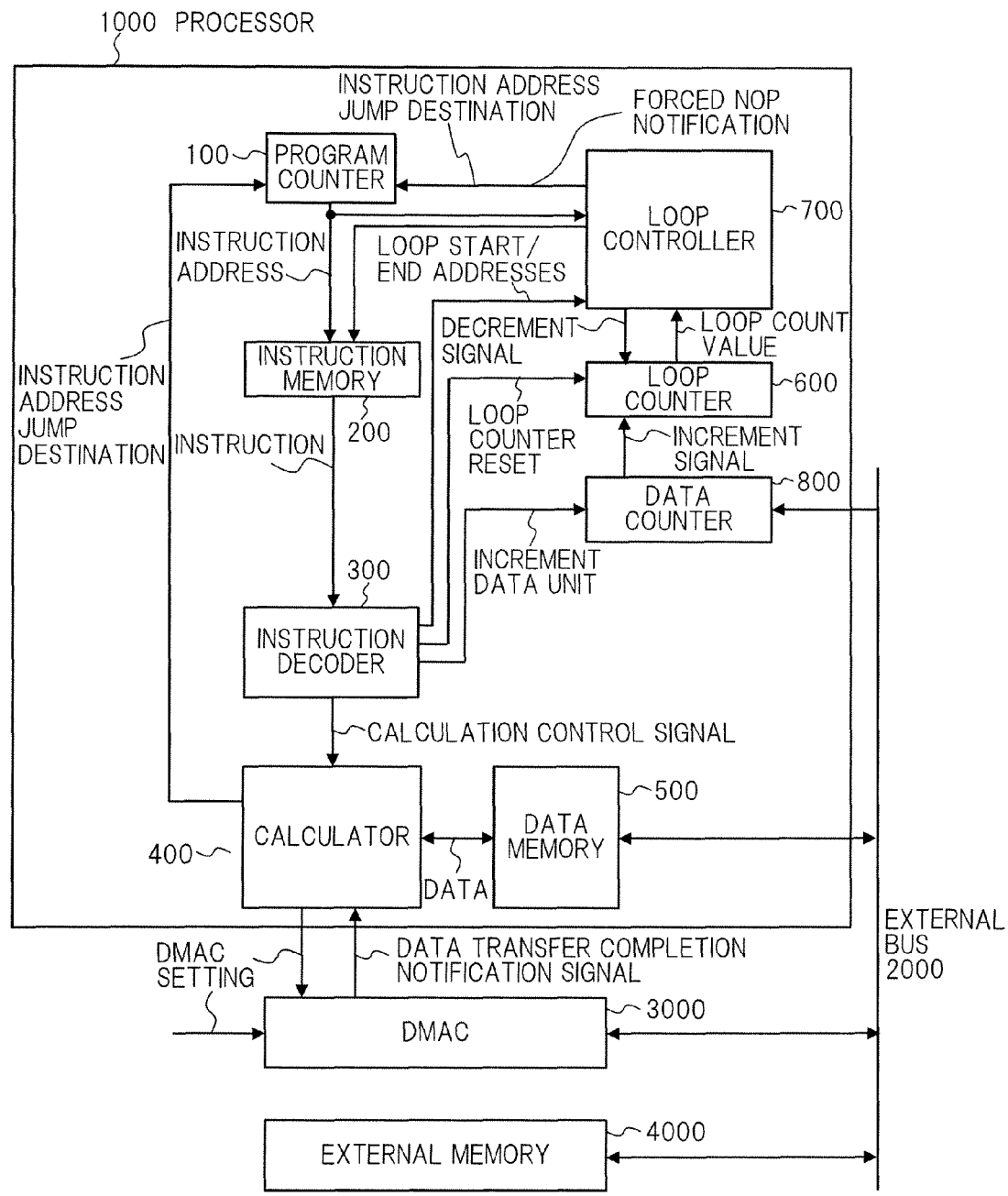
FIG. 3 is a block diagram showing a configuration of a processor of a first exemplary embodiment.

FIG. 3 shows a configuration of a processor of a first exemplary embodiment.

As shown in FIG. 3, processor 1000 of the exemplary embodiment includes program counter 100, instruction memory 200, instruction decoder 300, calculator 400, data memory 500, loop counter 600, loop controller 700, and data counter 800.

Figure 1:
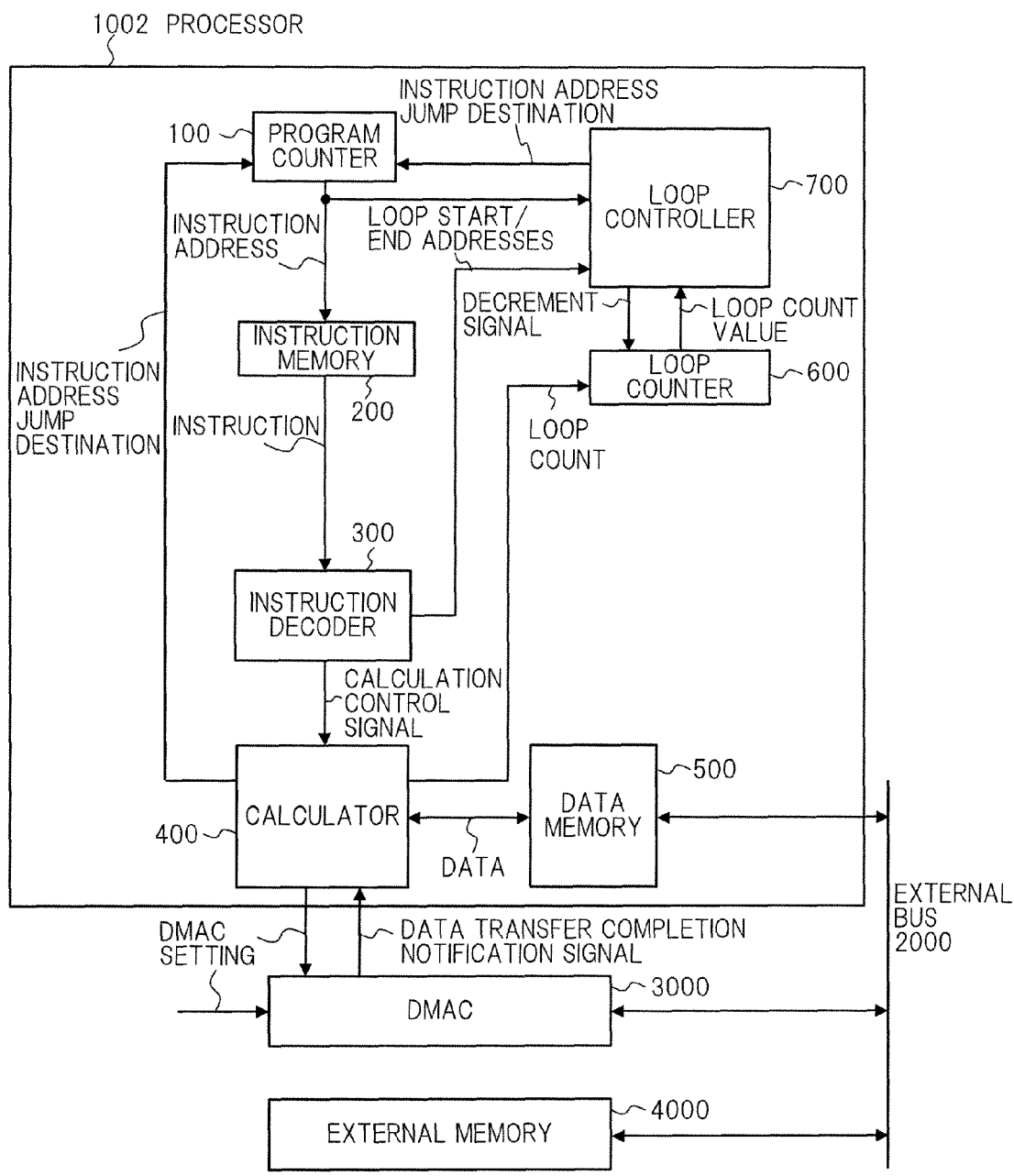
FIG. 1 is a block diagram showing a configuration of a processor of a related art.
Figure 2:
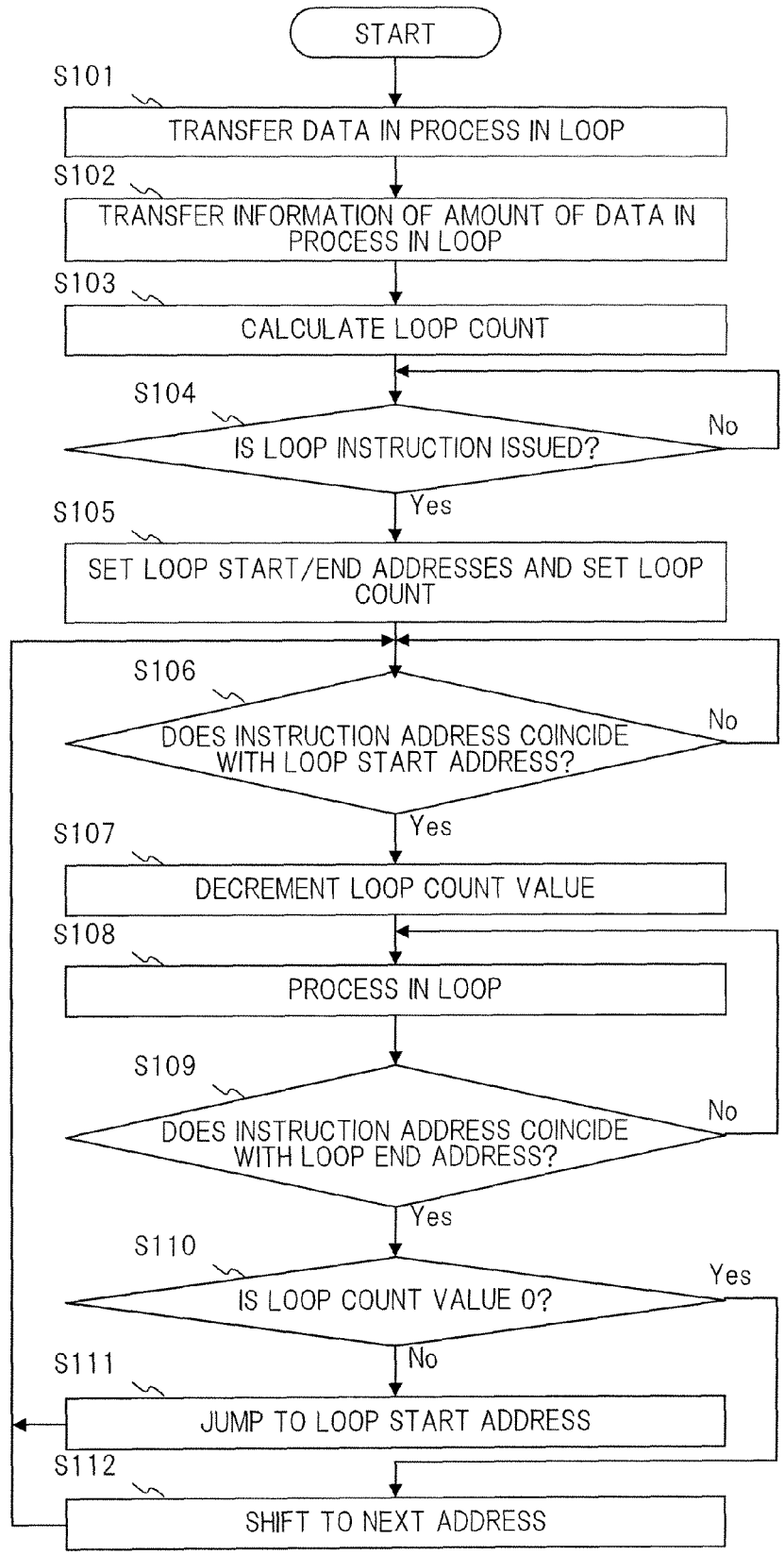
FIG. 2 is a flow chart describing an operation of the processor of the related art.

More specifically, compared to processor 1002 of the related art of FIG. 1, processor 1000 of the exemplary embodiment is different in that data counter 800 is added, and the other constituent elements are the same.

In processor 1002 of the related art, calculator 400 sets the loop count to loop counter 600. Meanwhile, in processor 1000 of the exemplary embodiment, instruction decoder 300 sets a loop count reset to loop counter 600. Loop controller 700 can notify instruction memory 200 of a forced NOP (No Operation) to forcefully issue a NOP instruction.

Added data counter 800, which is connected to external bus 2000, monitors data transfer from external memory 4000 to data memory 500 and notifies loop counter 600 of an increment signal every time a certain amount of data that is used for executing a process in the loop is transferred. The unit of data for incrementing loop counter 600 will be called an increment data unit. Instruction decoder 300 sets the increment data unit.

Program counter 100 notifies instruction memory 200 and loop controller 700 of an instruction address of an instruction to be issued. Usually, program counter 100 sequentially increments the instruction address and notifies the incremented instruction address. However, if calculator 400 or loop controller 700 sets an instruction address jump destination described later, program counter 100 notifies the instruction address of the set jump destination.

Instruction memory 200 fetches an instruction according to the instruction address notified by program counter 100 and issues the fetched instruction to instruction decoder 300. However, if the forced NOP notification is received from loop controller 700, instruction memory 200 issues a NOP instruction to instruction decoder 300.

Instruction decoder 300 decodes the instruction issued by instruction memory 200 and notifies calculator 400 of the decoded instruction as a calculation control signal. When a loop instruction is issued, instruction decoder 300 sets a loop start address and a loop end address to loop controller 700 and sets the increment data unit to data counter 800.

Calculator 400 performs various calculations according to the calculation control signal notified by instruction decoder 300. Calculator 400 loads data necessary for the calculations from data memory 500 to store the data in a register file included inside and uses the data to perform the calculations. Calculator 400 can also store a calculation result in data memory 500. If the calculation control signal obtained by decoding the loop instruction is notified, calculator 400 sets the loop count to loop counter 600. If the calculation control signal obtained by decoding the conditional branch instruction is notified, calculator 400 can branch the program progress by setting the instruction address jump destination to program counter 100 when a state (for example, a register file value or a data transfer completion notification signal notified by DMAC 3000) coincides with a condition defined by the calculation control signal.

Data memory 500 stores data from calculator 400 and loads data on calculator 400. Data can be transferred between data memory 500 and external memory 4000 outside of the processor through external bus 2000. DMAC 3000 manages the data transfer. DMAC 3000 manages the data transfer based on DMAC setting input from an external device including processor 1002.

If the instruction address notified by program counter 100 coincides with the loop start address set by instruction decoder 300, loop controller 700 determines whether the loop current value notified by loop counter 600 is 0. If the loop count value is 0, loop controller 700 notifies program counter 100 of the loop start address as the instruction address jump destination and notifies instruction memory 200 of the forced NOP to terminate the program progress until the loop count value becomes 1 or greater. On the other hand, if the loop count value is 1 or greater, loop controller 700 notifies loop counter 600 of a decrement signal.

As described, data counter 800, which is connected to external bus 2000, monitors the data transfer from external memory 4000 to data memory 500 and notifies loop counter 600 of the increment signal every time the data that is used for executing a process in the loop is transferred for the amount of the increment data unit.

Loop counter 600 resets the loop count value to 0 when instruction decoder 300 sets the loop counter reset. Loop counter 600 increments the loop count value by 1 every time the increment signal is notified by data counter 800 and decrements the loop count value by 1 every time the decrement signal is notified by loop controller 700.

If the instruction address notified by program counter 100 coincides with the loop end address set by instruction decoder 300 and if the loop count value notified by loop counter 600 is not 0, loop controller 700 notifies program counter 100 of the loop start address as the instruction address jump destination.

If the instruction address notified by program counter 100 coincides with the loop end address set by instruction decoder 300 and if the loop count value notified by loop counter 600 is 0, loop controller 700 notifies program counter 100 of an instruction address that follows the loop end address as the instruction address jump destination.

Hereinafter, an operation of processor 1000 of the exemplary embodiment will be described.

Figure 4:
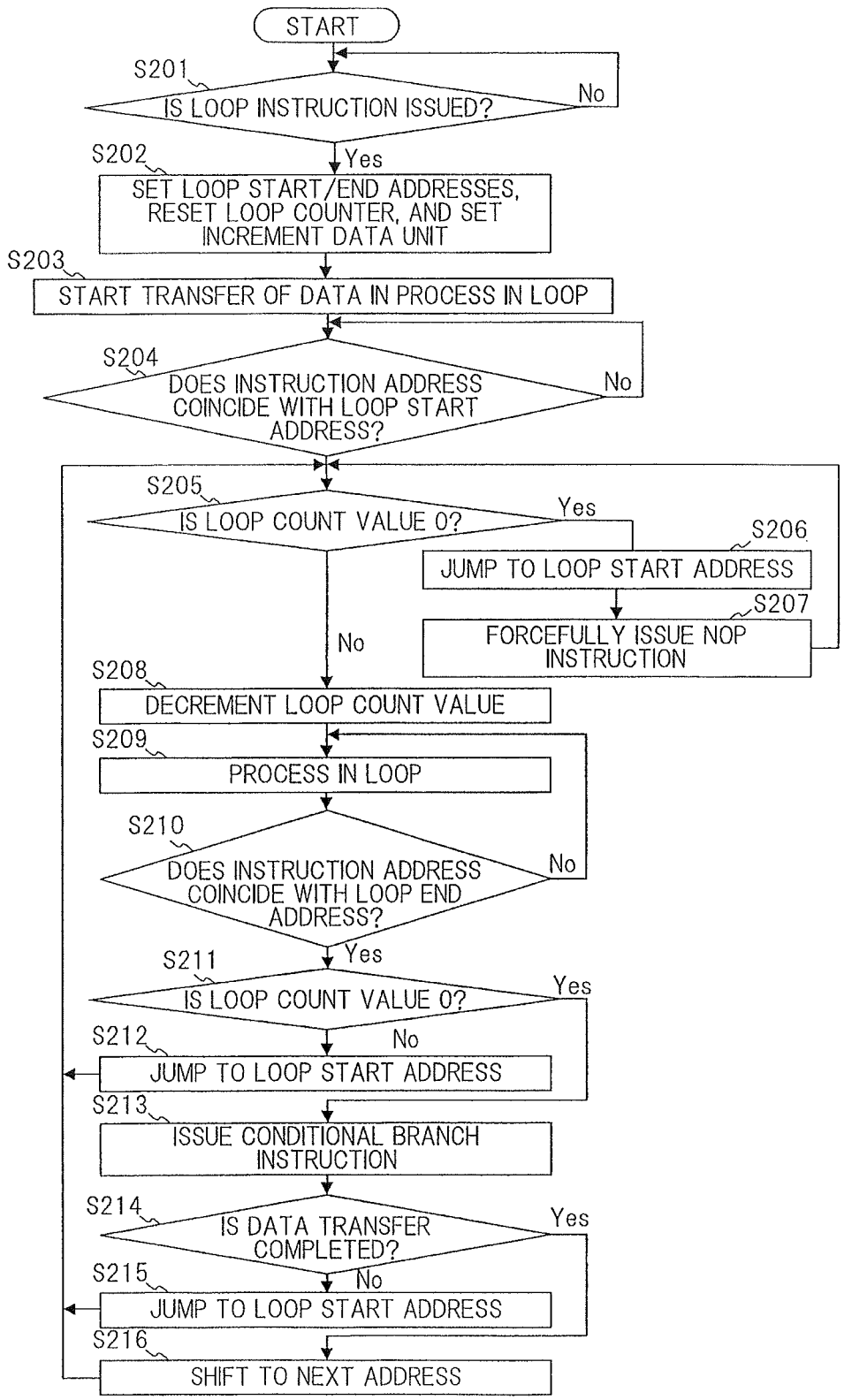
FIG. 4 is a flow chart describing an operation of the processor of the first exemplary embodiment.

FIG. 4 shows a processing flow of processor 1000 of the exemplary embodiment shown in FIG. 3.

As shown in FIG. 4, if a loop instruction is issued (Yes in step S201), the counter reset is set to loop counter 600. The loop start address and the loop end address are set to loop controller 700, and the increment data unit is set to data counter 800 (step S202).

External memory 4000 starts transferring the data that is used for executing a process in the loop to data memory 500 (step S203). Data counter 800 notifies loop counter 600 of the increment signal every time the data that is used for executing a process in the loop is transferred for the amount of the increment data unit.

After the loop instruction is issued and data transfer starts, the program advances until the instruction address coincides with the loop start address.

If the instruction address coincides with the loop start address (Yes in step S204), loop controller 700 determines whether the loop count value is 0 (step S205).

If the loop count value is 0 (Yes in step S205), loop controller 700 notifies program counter 100 of the loop start address as the instruction address jump destination until the loop count value becomes 1 or greater (step S206) and notifies instruction memory 200 of the forced NOP to terminate the program progress (step S207).

On the other hand, if the loop count value is 1 or greater (No in step S205), loop controller 700 notifies loop counter 600 of the decrement signal, and loop counter 600 reduces the loop count value by 1 (step S208).

Subsequently, calculator 400 advances the process in the loop until the instruction address reaches the loop end address (step S209).

If the instruction address coincides with the loop end address (Yes in step S210), loop controller 700 determines whether the procedure, in which data is used for executing a process in the loop up to this time, is finished based on the loop count value.

If the loop count value is not 0 (No in step S211), loop controller 700 determines that the process is not completed and notifies program counter 100 of the loop start address as the instruction address jump destination (step S212).

On the other hand, if the loop count value is 0 (Yes in step S211), loop controller 700 determines that the process is completed, and instruction memory 200 issues the conditional branch instruction (step S213). Calculator 400 determines whether the data transfer is completed (step S214). The completion of the transfer can be checked by the data transfer completion notification signal notified by DMAC 3000.

If the data transfer is not completed (No in step S214), calculator 400 notifies program counter 100 of the loop start address as the instruction address jump destination (step S215).

On the other hand, if the data transfer is completed (Yes in step S214), calculator 400 advances the program (step S216).

In this way, the procedure for executing a process in the loop can be applied to all data that is used for executing a process in the loop.

As described, in the exemplary embodiment, the process in the loop is executed by resetting the loop counter 600 to 0 when the loop instruction is issued, incrementing the loop counter 600 by 1 every time the certain amount of the data that is used for executing a process in the loop is transferred to data memory 500, and decrementing loop counter 600 by 1 when the loop count value of loop counter 600 is not 0.

More specifically, in the exemplary embodiment, the process in the loop is repeatedly executed according to the amount of data that is used for executing a process in the loop transferred to data memory 600, without setting the loop count.

Therefore, even in an application in which the loop count depends on the amount of data that is used for executing a process in the loop, and in which the amount of data that is used for executing a process in the loop is identified after the data that is used for executing a process in the loop is transferred from the outside to the data memory, the loop processing can be started just after the start of the data transfer.

As a result, compared to the related art, there are advantageous effects that the capacity of data memory 600 can be reduced and the delay of the process can be reduced.

In the exemplary embodiment, the conditional branch instruction is issued, and calculator 400 determines whether the data transfer is completed. However, it is obvious that the data transfer completion notification can be input to loop controller 700, and the result of the data transfer completion determination can be added to the loop exit condition when the instruction address coincides with the loop end address.

(Second Exemplary Embodiment)

Figure 5:
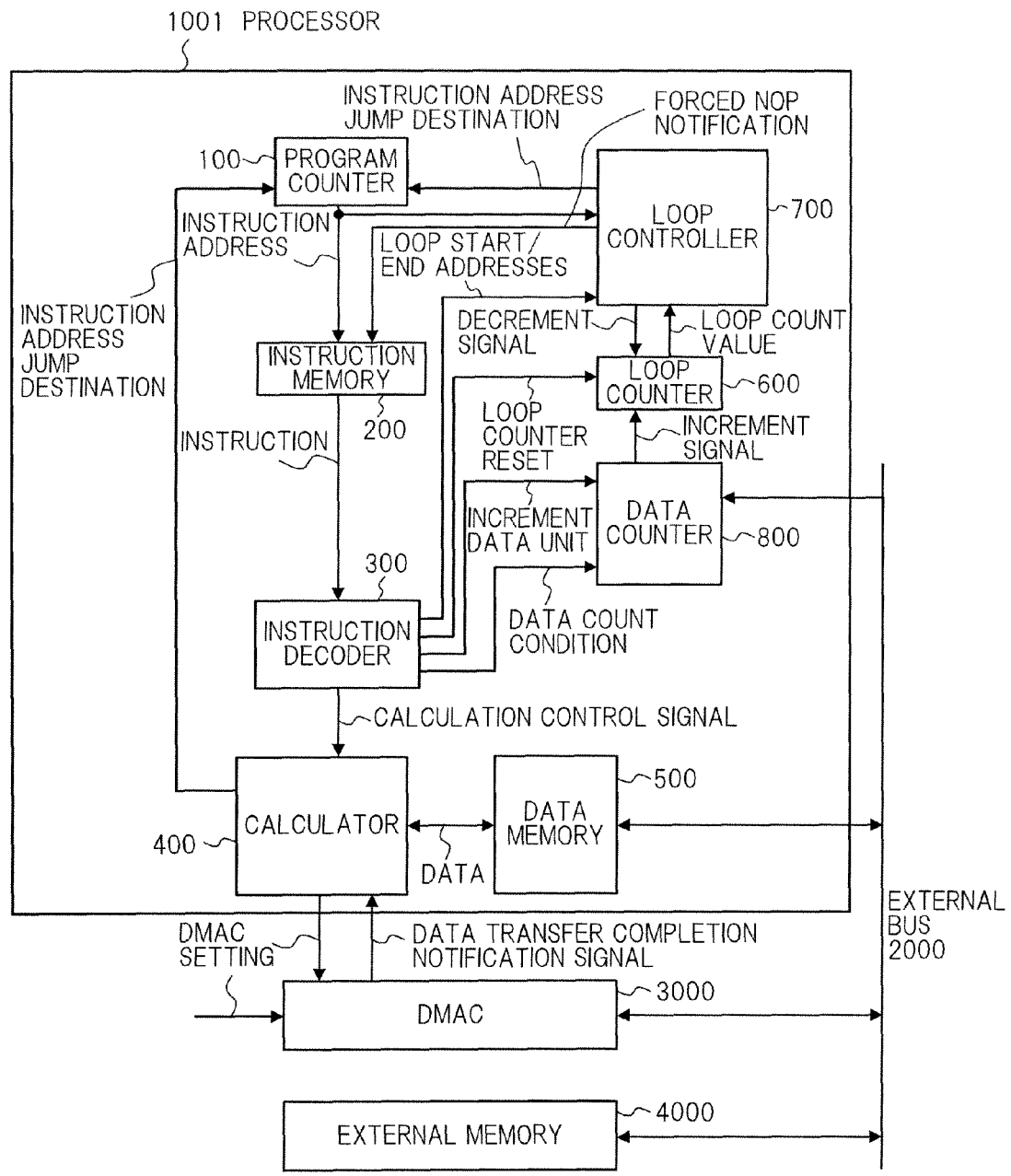
FIG. 5 is a block diagram showing a configuration of a processor of a second exemplary embodiment.

FIG. 5 shows a configuration of a processor of a second exemplary embodiment.

As shown in FIG. 5, processor 1001 of the exemplary embodiment has the same configuration as in the first exemplary embodiment except that instruction decoder 300 sets a data count condition to data counter 800.

When the loop instruction is issued by instruction memory 200, instruction decoder 300 sets the loop start address and the loop end address to loop controller 700, sets the loop counter reset to loop counter 600, and sets the data count condition and the increment data unit to data counter 800.

Data counter 800, which is connected to external bus 2000, monitors the data transfer from external memory 4000 to data memory 500 and notifies loop counter 600 of the increment signal every time the data that is used for executing a process in the loop is transferred for the amount of the increment data unit that satisfies the data count condition.

The data count condition may define, for example, the range of a value of the data. In this case, data counter 800 notifies loop counter 600 of the increment signal every time the data that is used for executing a process in the loop is transferred for the amount of the increment data unit at a value within the range defined by the data count condition.

The data count condition may also define the range of an address of data memory 500. In this case, data counter 800 notifies loop counter 600 of the increment signal every time the data that is used for executing a process in the loop is transferred for the amount of the increment data unit to an address within the range defined by the data count condition.

Although the present invention has been described with reference to the exemplary embodiments, the present invention is not limited to the exemplary embodiments. Various changes that can be understood by those skilled in the art can be made for the configurations and details of the present invention within the scope of the present invention.

This application claims the benefit of priority based on Japanese Patent Application No. 2009-266347 filed Nov. 24, 2009, the entire disclosure of which is hereby incorporated by reference.

The invention claimed is:

1. A processor, comprising:
a loop counter that is reset to 0 when a loop instruction for executing a process in a loop from a loop start address to a loop end address is issued;
a data memory that receives data that is used for executing a process in the loop, in which the data is transferred from outside;
a calculator that uses the data transferred to said data memory to execute the process in the loop;
a data counter that increments said loop counter by 1 every time a certain amount of data that is used for executing a process in the loop is transferred from the outside to a data memory, wherein said loop counter is only incremented as a result of incrementing of said data counter; and
a loop controller that decrements said loop counter by 1 and causes said calculator to execute the process in the loop when a loop count value of said loop counter is not 0,
wherein, when the loop count value of said loop counter is 0, said loop controller waits until the loop count value of said loop counter becomes 1 or greater, or said loop controller exits the loop when a loop exit condition corresponding to a data transfer completion notification is set.

2. The processor according to claim 1, wherein a data count condition is set in advance to said data counter, and said data counter increments said loop counter by 1 every time a certain amount of data that satisfies the data count condition is transferred from the outside to said data memory.

3. The processor according to claim 2, wherein the data count condition defines a range of a value of data, and wherein said data counter increments said loop counter by 1 every time a certain amount of data at a value within the range defined by the data count condition is transferred from the outside to said data memory.

4. The processor according to claim 2, wherein the data count condition defines a range of an address of said data memory, and
wherein said data counter increments said loop counter by 1 every time a certain amount of data is transferred to an address within the range defined by the data count condition, from the outside to said data memory.

5. The processor according to claim 1, further comprising:
a program counter that notifies the loop controller of an instruction address of an instruction to be issued.

6. The processor according to claim 5, wherein the program counter sequentially increments the instruction address and notifies the loop controller of the incremented instruction address.

7. The processor according to claim 5, wherein, when the instruction address notified by the program counter coincides with the loop start address, the loop controller determines whether the loop current value notified by loop counter is 0.

8. The processor according to claim 5, wherein, if the loop count value is 0, the loop controller notifies the program counter of the loop start address as an instruction address jump destination.

9. The processor according to claim 5, further comprising:
an instruction memory that received notification from the loop controller of a forced NOP (No Operation) to forcefully issue a NOP instruction.

10. The processor according to claim 9, wherein, if the loop count value is 0, the loop controller notifies the instruction memory of the forced NOP to terminate a program progress until the loop count value becomes 1 or greater.

11. The processor according to claim 9, wherein, if the loop count value is 1 or greater, the loop controller notifies the loop counter of a decrement signal.

12. A method for controlling loop count by a processor, the method comprising:
resetting a loop counter to 0 when a loop instruction for executing a process in a loop from a loop start address to a loop end address is issued;
incrementing said loop counter, by a data counter, by 1 every time a certain amount of data that is used for executing a process in the loop is transferred from outside to a data memory, wherein said loop counter is only incremented as a result of incrementing of said data counter; and
decrementing said loop counter, by a loop controller, by 1 and executing the process in the loop when a loop count value of said loop counter is not 0,
wherein, when the loop count value of said loop counter is 0, said loop controller waits until the loop count value of said loop counter becomes 1 or greater, or said loop controller exits the loop when a loop exit condition corresponding to a data transfer-completion notification is set.

13. The method of loop count control according to claim 12, wherein, in said incrementing said loop counter by 1, said loop counter is incremented by 1 every time a certain amount of data that satisfies a preset data count condition is transferred from the outside to said data memory.

14. The method of loop count control according to claim 13, wherein the data count condition defines a range of a value of data, and
wherein in said incrementing said loop counter by 1, said loop counter is incremented by 1 every time a certain amount of data at a value within the range defined by the data count condition is transferred from the outside to said data memory.

15. The method of loop count control according to claim 13, wherein the data count condition defines a range of an address of said data memory, and
wherein, in said incrementing said loop counter by 1, said loop counter is incremented by 1 every time a certain amount of data is transferred to an address within the range defined by the data count condition, from the outside to said data memory.

16. The method of loop count control according to claim 12, further comprising:
notifying a loop controller that performs said decrementing said loop counter of an instruction address of an instruction to be issued.

17. The method of loop count control according to claim 16, further comprising:
sequentially incrementing the instruction address and notifying the loop controller of the incremented instruction address.

18. The method of loop count control according to claim 16, wherein, when the instruction address coincides with the loop start address, the loop controller determines whether the loop current value is 0.

19. The method of loop count control according to claim 16, further comprising:
receiving, by an instruction memory, notification from the loop controller of a forced NOP (No Operation) to forcefully issue a NOP instruction.

20. The method of loop count control according to claim 19, wherein, if the loop count value is 0, the loop controller notifies the instruction memory of the forced NOP to terminate a program progress until the loop count value becomes 1 or greater.

* * * * *